US011641802B2

(12) United States Patent
Henne

(10) Patent No.: US 11,641,802 B2
(45) Date of Patent: May 9, 2023

(54) FORAGE HARVESTER MATERIAL APPLICATOR SYSTEM AND RELATED METHOD

(71) Applicant: Great Lakes Forage Systems, LLC, Grant, MI (US)

(72) Inventor: Michael P. Henne, Grand Rapids, MI (US)

(73) Assignee: Great Lakes Forage Systems, LLC, Grant, MI (US)

( * ) Notice: Subject to any disclaimer, the term of this patent is extended or adjusted under 35 U.S.C. 154(b) by 417 days.

(21) Appl. No.: 16/996,677

(22) Filed: Aug. 18, 2020

(65) Prior Publication Data
US 2022/0053697 A1    Feb. 24, 2022

(51) Int. Cl.
| | | |
|---|---|---|
| *A01D 43/14* | (2006.01) | |
| *A01D 45/00* | (2018.01) | |
| *B65G 33/16* | (2006.01) | |
| *B65G 33/26* | (2006.01) | |

(52) U.S. Cl.
CPC ............ *A01D 43/14* (2013.01); *A01D 45/00* (2013.01); *B65G 33/16* (2013.01); *B65G 33/265* (2013.01); *B65G 2811/091* (2013.01); *B65G 2812/0577* (2013.01)

(58) Field of Classification Search
CPC ........ A01D 43/14; A01D 45/00; B65G 33/16; B65G 33/265; B65G 2812/0522; B65G 2812/0527; B65G 2812/0577; A01F 15/0816

See application file for complete search history.

(56) References Cited

U.S. PATENT DOCUMENTS

| | | |
|---|---|---|
| 2,757,598 A | 8/1956 | West |
| 2,787,208 A | 4/1957 | Russell |
| 3,059,566 A | 10/1962 | Grau |

(Continued)

FOREIGN PATENT DOCUMENTS

| | | |
|---|---|---|
| EP | 2620051 | 7/2013 |
| EP | 3338529 | 6/2018 |
| GB | 2527046 | 12/2015 |

OTHER PUBLICATIONS

455 Pneumatic Granular Innoculant Applicator Operator's Manual, Valmar Airflo Inc., Publication Date Feb. 1998.

*Primary Examiner* — Gene O Crawford
*Assistant Examiner* — Keith R Campbell
(74) *Attorney, Agent, or Firm* — Warner Norcross + Judd LLP

(57) ABSTRACT

A system and related method of applying forage treatment material to harvested forage is provided. The method can include harvesting forage, rotating a flexible auger in a bin and in a curved or angled part of a tube to convey a granular treatment material toward harvested forage moving in a chute to mix the material with the harvested forage. The system can include a flexible auger having a helical blade that extends around an auger central passageway. The auger rotates and augers the granular treatment material with the blade out of the bin. The auger can extend into a curved portion of the tube, taking on a curved configuration extending into the curved portion so that the auger extends along a curvilinear axis and includes a curvilinear portion that is rotationally constrained in the tube.

20 Claims, 7 Drawing Sheets

(56) References Cited

U.S. PATENT DOCUMENTS

| | | | |
|---|---|---|---|
| 3,812,956 A * | 5/1974 | Hindermann | B65G 33/00 |
| | | | 198/662 |
| 5,082,414 A * | 1/1992 | Taupin | B65G 65/466 |
| | | | 222/413 |
| 6,988,352 B2 | 1/2006 | Van Vooren | |
| 7,300,003 B1 * | 11/2007 | Kreikemeier | A01D 43/14 |
| | | | 239/654 |
| 7,874,133 B2 | 1/2011 | Depestel | |
| 7,900,557 B2 * | 3/2011 | Freeman | A01F 15/0816 |
| | | | 56/341 |
| 10,426,090 B2 | 10/2019 | Henne | |
| 10,694,657 B2 * | 6/2020 | Grieshop | G01F 13/005 |
| 2002/0124541 A1 | 9/2002 | Oepping et al. | |
| 2003/0006312 A1 | 1/2003 | Dohrmann et al. | |
| 2003/0201333 A1 | 10/2003 | Oepping et al. | |
| 2005/0077389 A1 | 4/2005 | Lebeda et al. | |
| 2011/0120071 A1 | 5/2011 | Freeman et al. | |
| 2011/0167777 A1 | 7/2011 | Dohrmann | |
| 2012/0090287 A1 | 4/2012 | O'Daniel | |
| 2018/0141758 A1 | 5/2018 | Ross | |
| 2019/0223381 A1 * | 7/2019 | Henne | A01D 41/127 |

\* cited by examiner

FORAGE HARVESTER MATERIAL APPLICATOR SYSTEM AND RELATED METHOD

BACKGROUND OF THE INVENTION

The present invention relates to forage harvesters, and more particularly to a material applicator system and related method to precisely apply treatment material to crops harvested by a forage harvester.

In the farming industry, when crops are harvested, it is frequently helpful to apply additives, for example, chemical or biological treatments such as preservatives to those crops, also referred to as forage herein, to improve, preserve or maintain the feed or other value of the forage. Applying the additive materials in the correct amounts can be a challenge because the rate of harvesting varies with factors such as the particular forage harvester used in the harvest, the speed and operation of the harvester, the crop quality and its density. Adding incorrect amounts of additives can lead to a waste of expensive additives and/or deterioration of the harvested forage when it is stored.

Some manufacturers provide application systems to address the issue of adding the correct amount of such additives. One manufacturer is Great Lakes Forage Systems, LLC of Grand Rapids, Mich. Its system is disclosed in U.S. Pat. No. 10,426,090 to Henne, which is incorporated by reference in its entirety here. Some systems disclosed in this patent utilize a vacuum drawn in an intake of a forage harvester to pull and apply a treatment material. While this system works well, in some harvesters, the amount of vacuum drawn can vary depending on the load on the machine, the machine's operating systems and other factors. Therefore, relying on the vacuum to consistently draw and distribute treatment material can sometimes have shortcomings.

Accordingly, there remains room for improvement in the field of forage harvesting and related equipment, and in particular, precision application of forage treatment materials.

SUMMARY OF THE INVENTION

A system and related method of precisely applying forage treatment material to harvested forage is provided.

In one embodiment, the system can include a bin that contains an amount of granular treatment material, a tube extending from the bin and a flexible auger in the bin that rotates to move the granular treatment material out of the bin. The flexible auger can extend into a curved portion of the tube, taking on a curved configuration extending into the curved tube portion so that the auger extends along a curvilinear axis and includes a curvilinear portion that is rotationally disposed in the curved portion of the tube.

In another embodiment, the bin can gravity feed a supply of the granular treatment material to the auger in a bottom of the bin. The flexible auger can extend along the bottom in a linear manner, generally along a linear axis. The flexible auger can transition from the linear axis to the curvilinear axis, for example, from inside the bin to a location outside the bin in the curved tube portion.

In still another embodiment, the flexible auger can include a blade that wraps around a central auger passageway along a length of the auger. The blade can be of a helical configuration. The blade can engage a portion of an interior of the curved tube portion and can flex or bend so that the blade rotates inside the interior. The interior surface of the curved tube can constrain the blade as it rotates so that the auger rotates about the curvilinear axis. The treatment material can be moved along the blade and within the central passageway as it is conveyed by the auger.

In yet another embodiment, the flexible auger can project into the tube at least six inches or more. In some cases, the flexible auger can project at least 6 inches, or at least 1, 2, 3, 4, 5 or more feet into the tube. Due to its flexible nature, the auger can take on the shape of the tube, whether it is curved, straight, angled or otherwise from the bin toward a distal end of the tube.

In even another embodiment, the tube can include a proximal tube end joined with the bin. The tube can extend along a curve having a radius of at least 1, 2, 3, 4, 5 or more feet. The flexible auger can extend into the tube in that area and can rotate about the curvilinear axis in that area.

In a further embodiment, the system can be mounted on a motorized forage harvester capable of conveying itself along the ground. The bin, auger and a motor that rotates the auger can be mounted on a platform adjacent an operator cab of the harvester, or other locations, depending on the harvester. The harvester can include a longitudinal axis extending from a front to a rear, an engine, a body driven by the engine, a cutting head forward of the body, and an ejector chute that propels the harvested forage from the motorized forage harvester along a trajectory through the air toward a container distal from the motorized forage harvester.

In still a further embodiment, the tube of the system can extend from the bin to a vacuum source generated by the motorized forage harvester. The vacuum source can draw a vacuum to pull the granular treatment material in the tube. The flexible auger can include a portion extending in the tube. The auger can rotate and convey the material through the tube in cooperation, with the vacuum also drawn through the tube and acting on the material, so that the material can mix with the harvested forage.

In yet a further embodiment, the method can include harvesting forage, rotating a flexible auger in a bin and in a curved or angled part of a tube to convey a granular treatment material toward harvested forage moving in a chute to mix the material with the harvested forage. The system can include a flexible auger having a helical blade that extends around an auger central passageway. The auger can rotate and auger the granular treatment material with the blade out of the bin.

In even a further embodiment, the method can include rotating a linear portion of the auger along an auger linear axis in the bottom of the bin and rotating a curvilinear portion of the auger along an auger curvilinear axis. The auger curvilinear axis can be aligned with a tube curvilinear axis of the transfer tube.

In another, further embodiment, the tube can extend forward of the bin and around a cab forward portion. The granulated treatment material can be conveyed along an arcuate path in the tube during the conveying step, forward of the cab and toward the chute of the harvester or generally toward a pathway along which the harvested forage moves.

In yet another embodiment, the tube can extend rearward of the bin and through a side panel of the harvester toward a chute. The granulated treatment material can be conveyed along an arcuate path in the tube during the conveying step, rearward and/or under the cab and toward the chute of the harvester.

The current embodiments of the system and related method of applying forage treatment material to harvested forage provide benefits in crop treatment that previously have been unachievable. For example, forage treatment material can be precisely metered and applied to harvested forage on the fly, as the forage is harvested. Where the flexible auger is included, it can rapidly and consistently feed and convey granulated material in a transfer tube to move the material from the bin to the chute efficiently. In many applications, the material can thus be moved mechanically via the rotation of the blade of the auger toward the chute, without relying on a vacuum to draw the material. This can operate in some cases more consistently, In other applications, the flexible auger can mechanically engage and feed the material toward the chute, and the vacuum can operate in concert with that mechanical feed to provide adequate supply of the material into the chute. The flexible auger can extend into a variety of differently shaped, curved and angled portions of a transfer tube, yet still function efficiently to convey the material therein. The material can be less prone to jamming or clogging the tube where the flexible auger includes an internal passageway within the blade because the material can move along the helical blade, as well as in the internal passageway.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
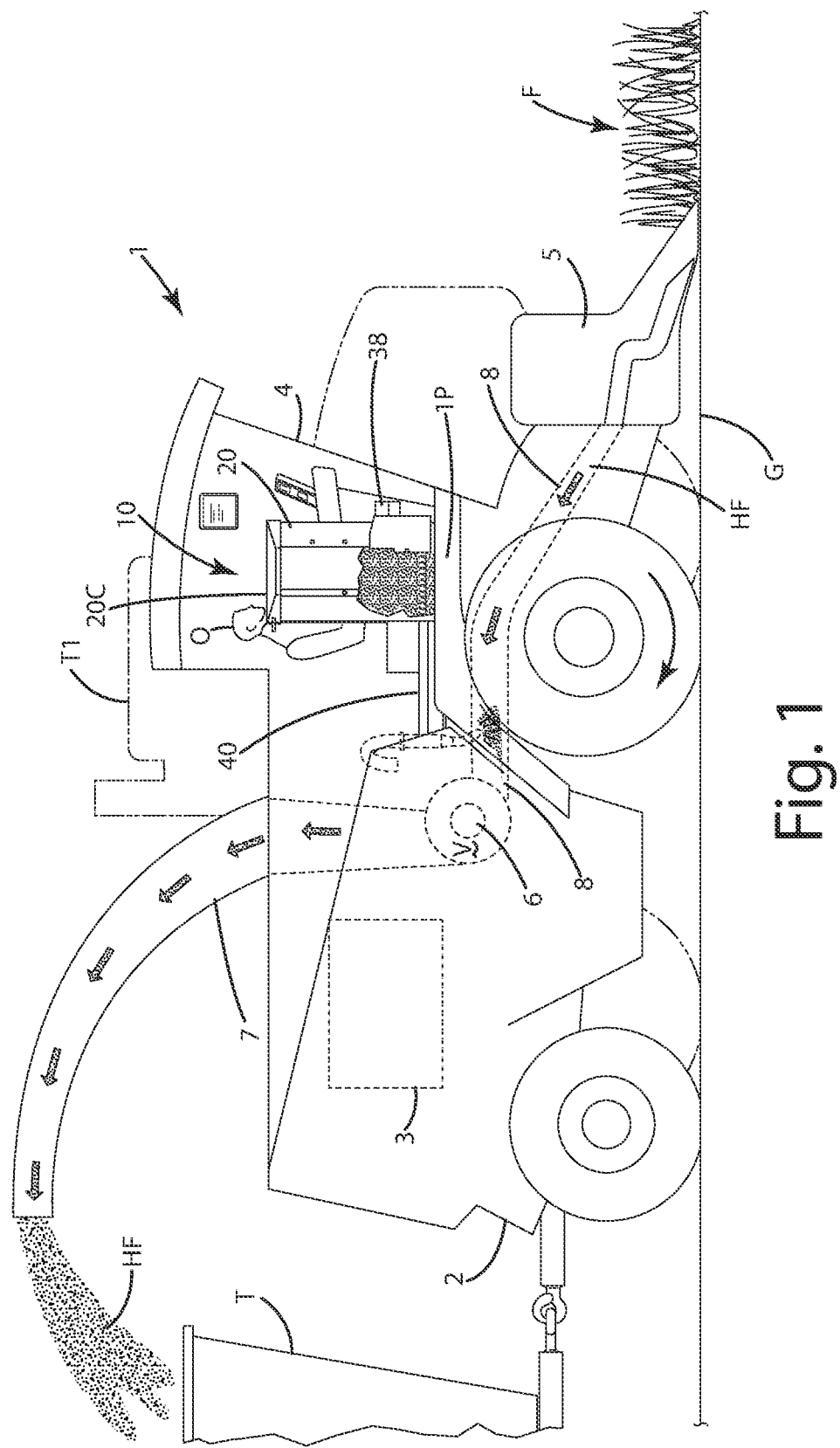
FIG. 1 is a side view of a forage harvester harvesting forage in a field while an agricultural forage treatment applicator system of a current embodiment applies forage treatment material to the forage as the forage harvesting is ongoing.

A current embodiment of the agricultural forage treatment applicator system is illustrated in FIGS. 1-5, and generally designated 10. The applicator system 10 is mounted on a forage harvester 1, which can be a motorized forage harvester capable of harvesting forage F from a field G as the harvester 1 moves along the ground in the field F under power provided by an engine 3 of the harvester 1. Of course, this system can also be utilized with other types of forage harvesters that may or may not be motorized. The harvester may come in the form of a pull behind trailer that is not motorized, but rather pulled by another motorized implement such as a tractor or truck. The current embodiment of the system 10 will, however, be described in conjunction with a motorized forage harvester.

The system 10 also will be described in conjunction with the harvest of forage F. Forage F can be any type of crop, for example alfalfa, corn, wheat, sorghum, and any other type of crop, such as grains, grasses, legumes and the like. Further, the system 10 will be described in conjunction with the dispensation and application of a generally dry, granular treatment material 100. This granular treatment material optionally can comprise a particulate matter that is coated with, admixed with or otherwise joined or associated with a chemical and/or biological material, for example, a preservative and/or one or more bacteria strains. As another example, the particulate matter can be in the form of sand or a silica-based or inert, nontoxic carrier type dry material having low or no moisture content. The material can be coated with and/or mixed with a preservative such as potassium sorbate. The treatment material, for example the particulate matter, also can be admixed with a powder or have coated thereon or otherwise associated there with one or more bacteria strains in a dormant, non-multiplying form. Optionally, one, two, three or more types of bacteria strains can be included in the treatment material. These bacteria strains can be fermenting bacteria, such as lactic acid producing bacteria and/or other silage fermentation organisms. The treatment material optionally can include enzymes, such as cellulases, amylases, hemicellulases, pectinases and xylanases, or other ingredients that facilitate the breakdown of organic compounds of the forage into substances that animals and microbes can use as a source of nutrients. Further optionally, the treatment material can include glucose or molasses as a source of sugar to stimulate bacterial action to get the bacteria to start fermentation immediately. It will be appreciated that although the granular treatment material described herein can be a type of preservative, other types of biological, chemical or other types of treatment materials can be applied to the forage with the applicator system herein.

Figure 2:
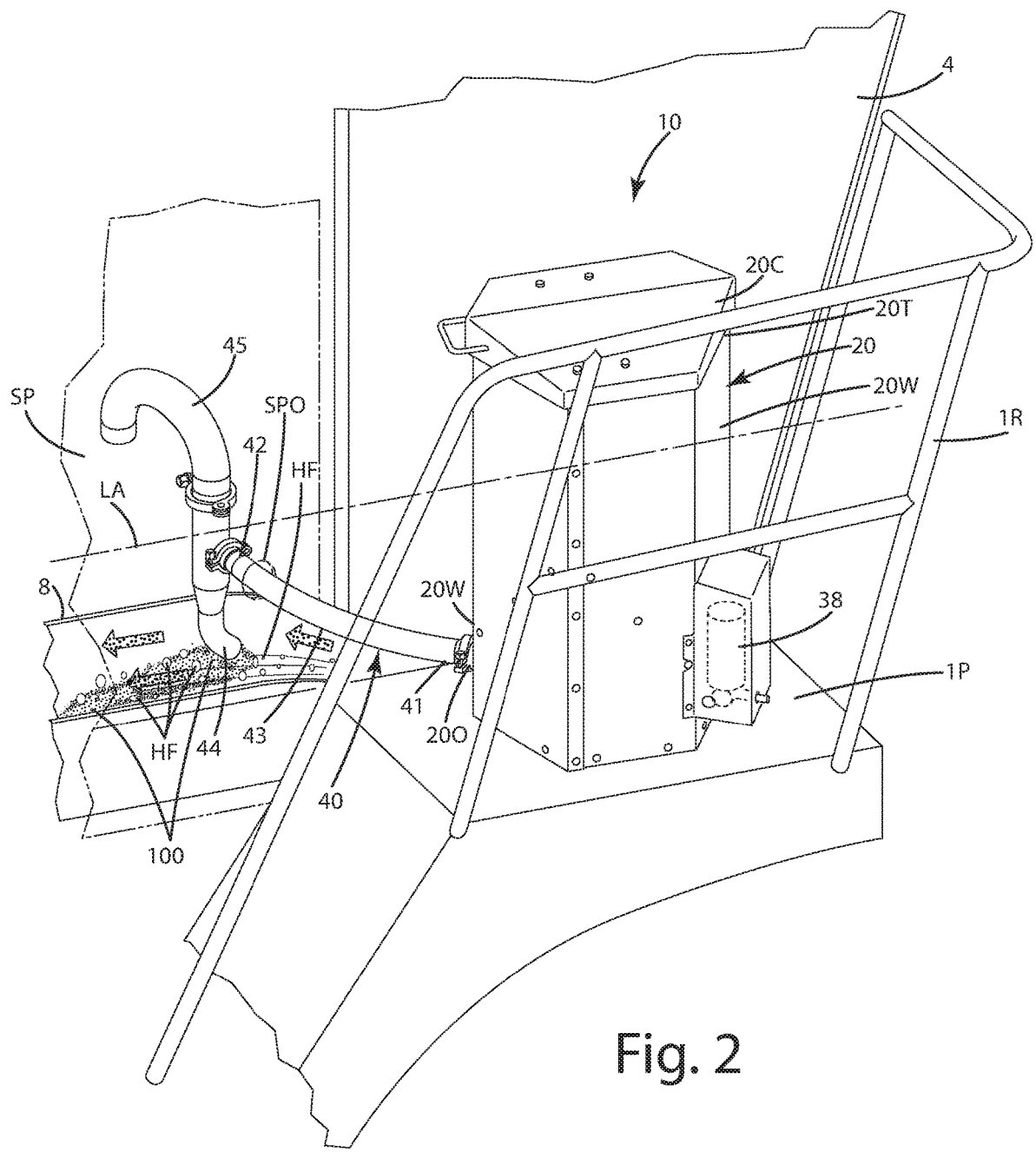
FIG. 2 is a perspective view of a bin and tube of the forage applicator treatment system, with the tube extending rearward of the bin and through a side panel of the harvester.
Figure 3:
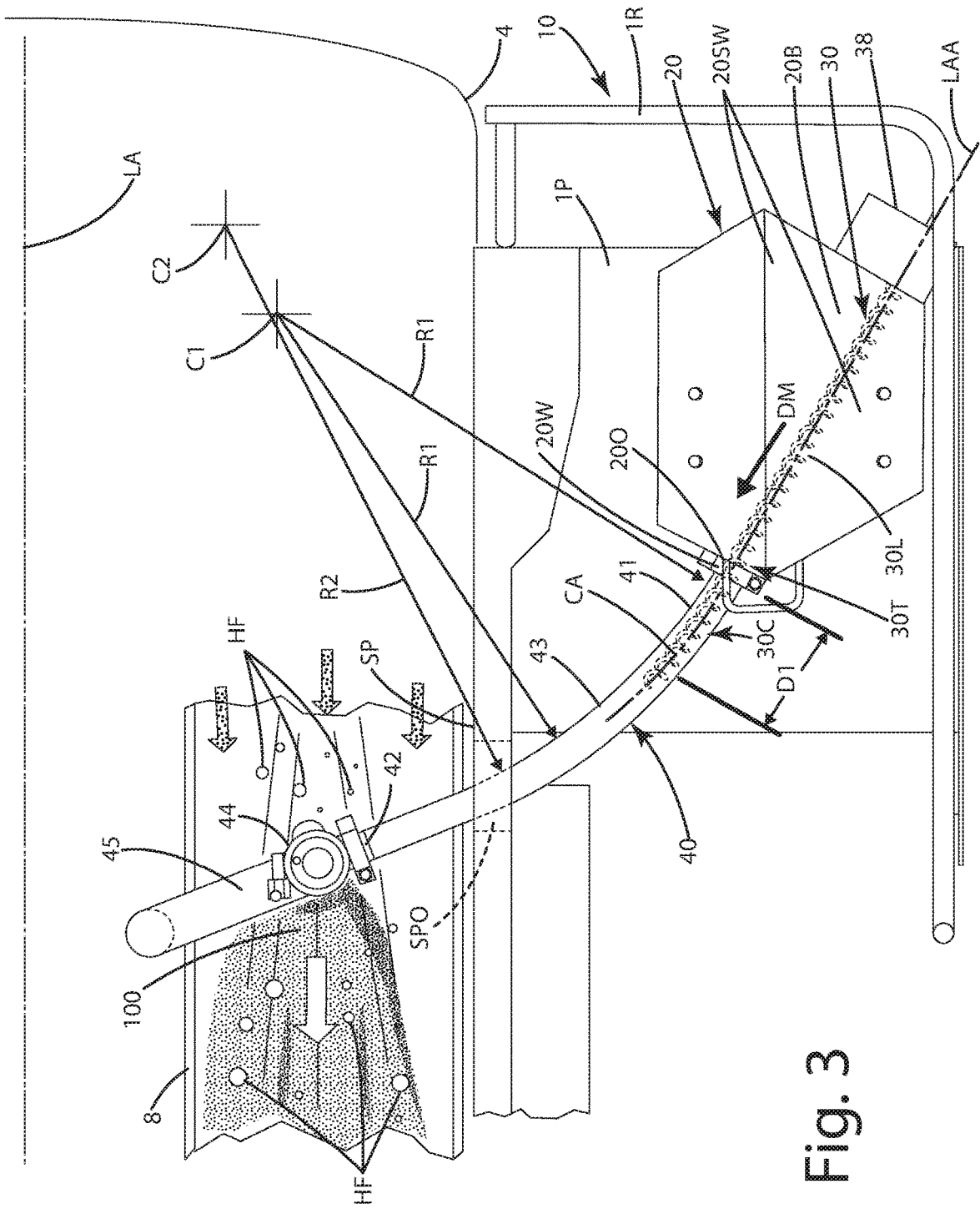
FIG. 3 is a top view of the bin, tube and helical auger extending in a curved portion of the tube at a radius of a center of a reference circle for a distance.

With reference to FIGS. 1-3, the system 10 can be mounted on the motorized forage harvester 1 having an engine 3 mounted in a body 2 of the harvester to run a fan 6, as well as move the harvester 1 along the ground in a field G in which the forage F grows. The harvester 1 can include a longitudinal axis LA extending from front to back of the harvester, generally bisecting or dividing the harvester into left and right sides. The engine 3 also can run a powerful fan 6, also referred to as an accelerator or a blower, which is in fluid communication with a chute 8. Examples of such fans are described in U.S. Pat. No. 7,874,133 to Depestel and U.S. Pat. No. 6,988,352 to Van Vooren, which are hereby incorporated by reference in their entirety. The fan can draw a vacuum V within itself and/or in the chute 8 that conveys chopped forage HF from the chopper head 5 optionally to the ejector chute 7, sometimes referred to as the discharge spout, which propels the chopped forage HF along a trajectory shown in FIG. 1 to another container, which can be a trailer T pulled by another machine T1, which can be a truck, tractor or other motorized vehicle.

With reference to FIGS. 1-4, the system 10 can include a container, box or bin 20 that is mounted on the harvester 1. Optionally, this box 20 can be mounted on a platform 1P that is adjacent the operator cab 4 of the harvester 1. The bin 20 can be mounted within a rail 1R that extends around a portion of the platform 1P. The bin 20 can include a cover 20C to prevent precipitation, debris or other elements from entering the interior 20I of the bin. The bin can be selectively sized to accommodate a given amount of treatment material 100, which as illustrated, is a granular treatment material in dry and flowable form. The bin 20 can include a top 20T which can include an opening through which the treatment material is loaded into the bin. The bin can include walls 20W and optionally slanted walls 20SW below the walls 20W near the bottom 20B. The slanted walls 20SW can convey the material, which can be gravity fed along those walls, toward an auger 30. The bin and walls can be constructed from a suitable material, such as metal, composites, polymers and the like. The bin 20 can be bolted or otherwise fastened to the platform 1P in an upright manner. As shown in FIG. 2, the bin can define an auger opening 22 adjacent the location where the slanted walls 20SW converge. That auger opening can extend through a wall 20W adjacent the bottom 20B.

Figure 3A:
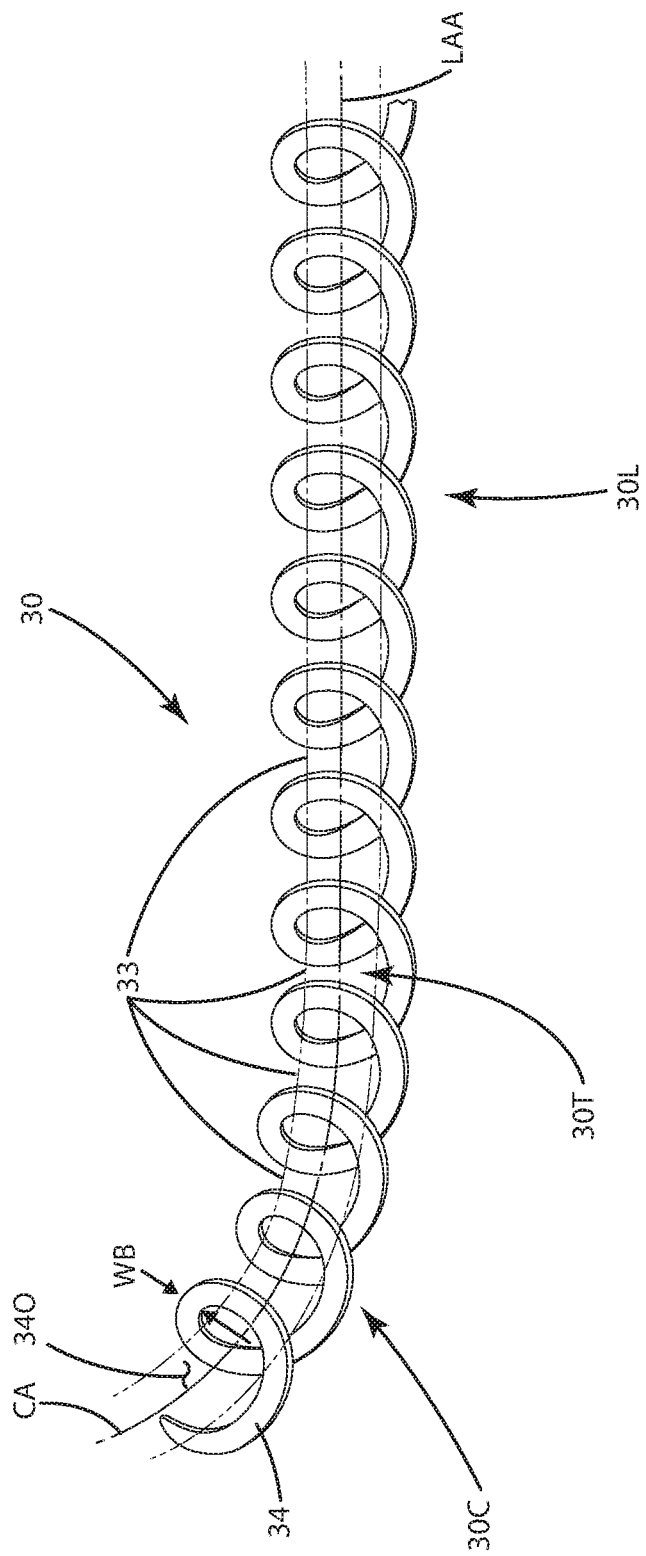
FIG. 3A is an enlarged view taken from IIIA in FIG. 3.
Figure 4:
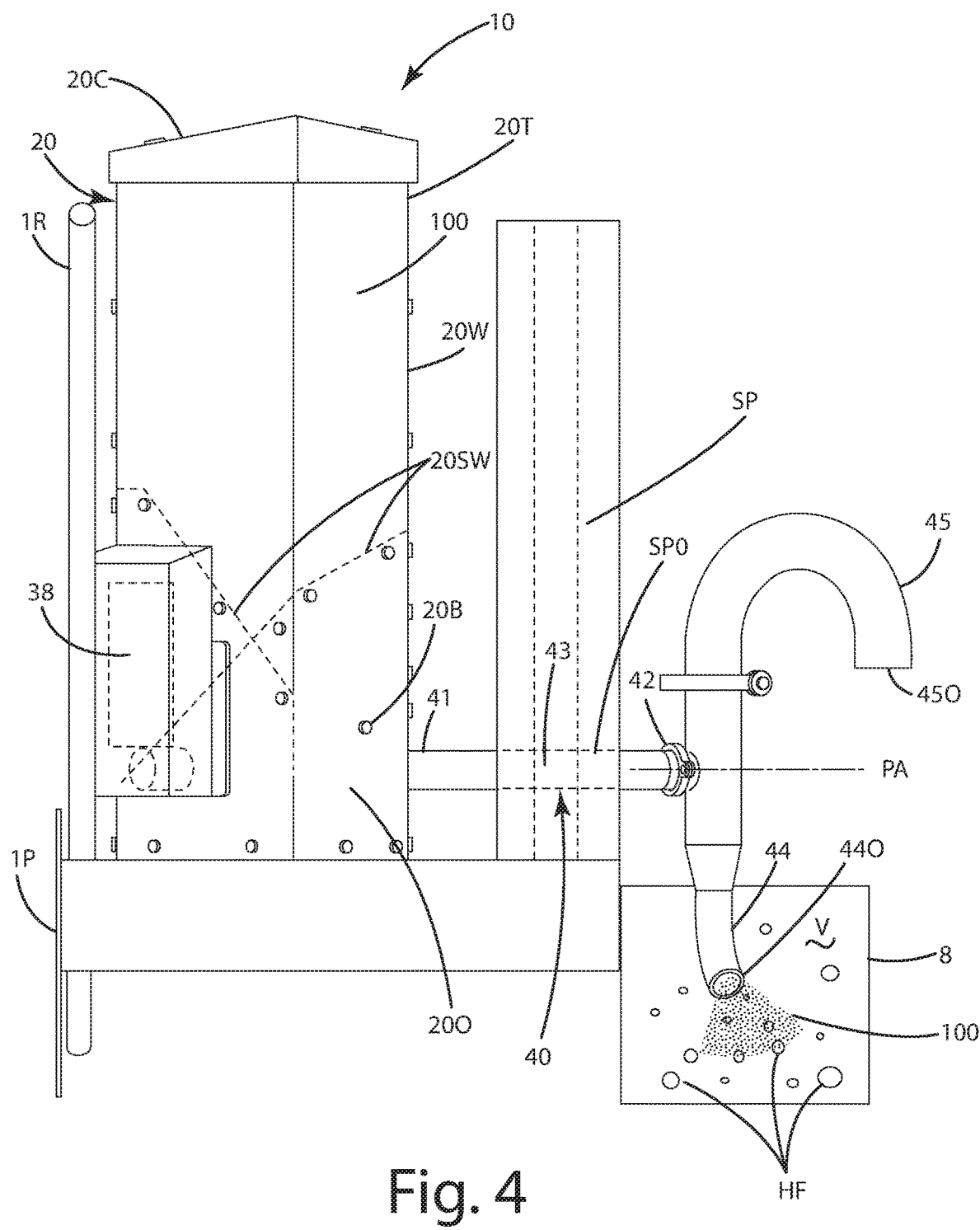
FIG. 4 is a front view of the bin and tube, with the tube extending through the side panel of the harvester and a terminating end of the tube in a chute.

As shown in FIGS. 2-4. The system can include an auger 30 in the form of a flexible auger that is optionally void of a central support shaft. The auger can be bent or disposed along an arcuate path, yet still can rotate. The auger can include a blade 34 in the form of a helical fin that extends repeatedly around an auger central passageway 33. The blade 34 can be substantially helical as shown, or can be generally helical, not following a perfect helix, depending on the application. Optionally, although shown as a continuous blade, the helical fin can be interrupted in some locations but still considered a helical blade. Further, the helical fin 34 optionally can be discontinuous. The blade 34 can surround the auger central passageway 33 as shown in FIG. 3A and can be inset a distance from the outermost portions 34O of the blade that is equal to the width WB of the blade 34. The internal passageway can extend radially outward from an auger axis to an inner edge of the blade. Generally, the auger can convey granular treatment material in the bin, adjacent the sidewalls, toward the opening 22O defined by the bin.

As mentioned above, the granular treatment material 100 can be fed toward the auger 30 under the force of gravity. In so doing, the material can slide down and/or along the sidewalls 20W, as well as along the slanted walls 20SW toward the auger. The auger can be rotated via a motor 38. The motor 38 can be powered by a battery or other power source on board the harvester 1. The motor can supply the rotational force and torque to rotate the auger 30 to convey the material 100 in the bin 20 toward the opening 20O. The motor 38 can be electrically coupled to a controller of the system 10 which can be mounted in the operator cab 4 of the harvester 1, in plain view of the operator O. The motor can rotate the flexible auger at one or more RPMs, depending on the feed rate of the material from the bin to the chute to treat the harvested forage HF in the chute.

As illustrated in FIGS. 3 and 3A, the flexible auger 30 can extend within or near the bottom of the bin, through the opening 22O and into a transfer tube 40 a preselected distance. As shown, the auger 30 can extend along a linear axis LAA in the bin 20, generally at or near the bottoms of the sidewalls 20SW. This portion of the auger can be an auger linear portion 30L. The auger also can extend along a curvilinear axis CA. This portion of the auger with the curvilinear portion can be an auger curvilinear or curved portion 30C. This auger curvilinear portion 30C can extend inside and/or outside the bin. The auger linear portion 30L can transition at a transition portion 30T to the auger curvilinear portion 30C at or near the opening 20O. In some cases, the transition portion can be spaced optionally less than 1 inch, less than 2 inches, less than 3 inches, less than 4 inches, less than 5 inches, or less than 6 inches from the opening 20O. The auger central or internal passageway 33 can include and extend along the above noted curvilinear and linear axes. The blade 34 also can wrap or extend around these axes and the internal passageway 33.

Optionally, the internal auger passageway 33 can take on different configurations along the length of the auger. For example, the passageway 33 can be substantially cylindrical in the linear portion 30L of the auger. The internal auger passageway 33 also can extend along a curvilinear axis CA having a constant or other radius of curvature in the curvilinear portion 30C of the auger. In the curvilinear portion, the internal auger passageway 33 can be curved, but can have a generally circular cross section when sectioned perpendicular to the curvilinear axis CA.

As mentioned above, the auger 30 can extend through the opening 20O and into the tube 40. The auger can extend a distance D1, which can be optionally at least 2 inches, at least 3 inches, at least 4 inches, at least 5 inches, at least 6 inches, at least 1 foot, at least 2 feet or at least 3 feet, into the tube 40. The tube 40 can include a tube interior surface 40I which can engage the auger when the auger is inside the tube. The helical blade 34 of the auger optionally engages and rotates against the interior surface of the tube.

The tube can be at least partially curved and can include one or more curved tube portions 40C1 and 40C2. The curved portion 40C1 can extend away from the bin, and the curved portion 40C2 can be located farther from the bin. The curved portion 40C1 can curve about a center point C1 of a circle having a first radius R1 of optionally at least 1 foot, at least 2 feet, at least 3 feet, at least 4 feet, at least 5 feet, or other radii. The curved portion 40C2 can curve about a center point C2 of another circle having a second radius R2 of optionally at least 1 foot, at least 2 feet, at least 3 feet, at least 4 feet, at least 5 feet, or other radii. The first and second radii can be different, with one greater than the other, depending on the application. In other cases, the entire curved tube can have a common radius and can extend along a common curvilinear axis.

As shown in FIG. 3, the auger 30 can extend into the curved tube portion 40C1 and takes on a curved configuration extending into the curved tube portion so that the auger extends along the curvilinear axis CA and includes a curvilinear portion 30C that is rotationally constrained in the curved tube portion. The interior 40I of the tube 40 can engage the blade, and can hold the blade and auger in the tube in general in a curved configuration. This curved configuration can be maintained even as the material in the bin is fed in direction DM from the bin and into the tube. The material itself can travel along the blade as it rotates in the linear and curvilinear portions, and also can travel in the internal passageway of the blade, moving in the bottom of the bin and in the tube accordingly. Optionally, an auger linear portion rotates about the auger linear axis in a bottom of the bin. The curvilinear portion, in the tube, for example the curved portion of the tube, rotates about the curvilinear axis outside the bin.

Figure 5:
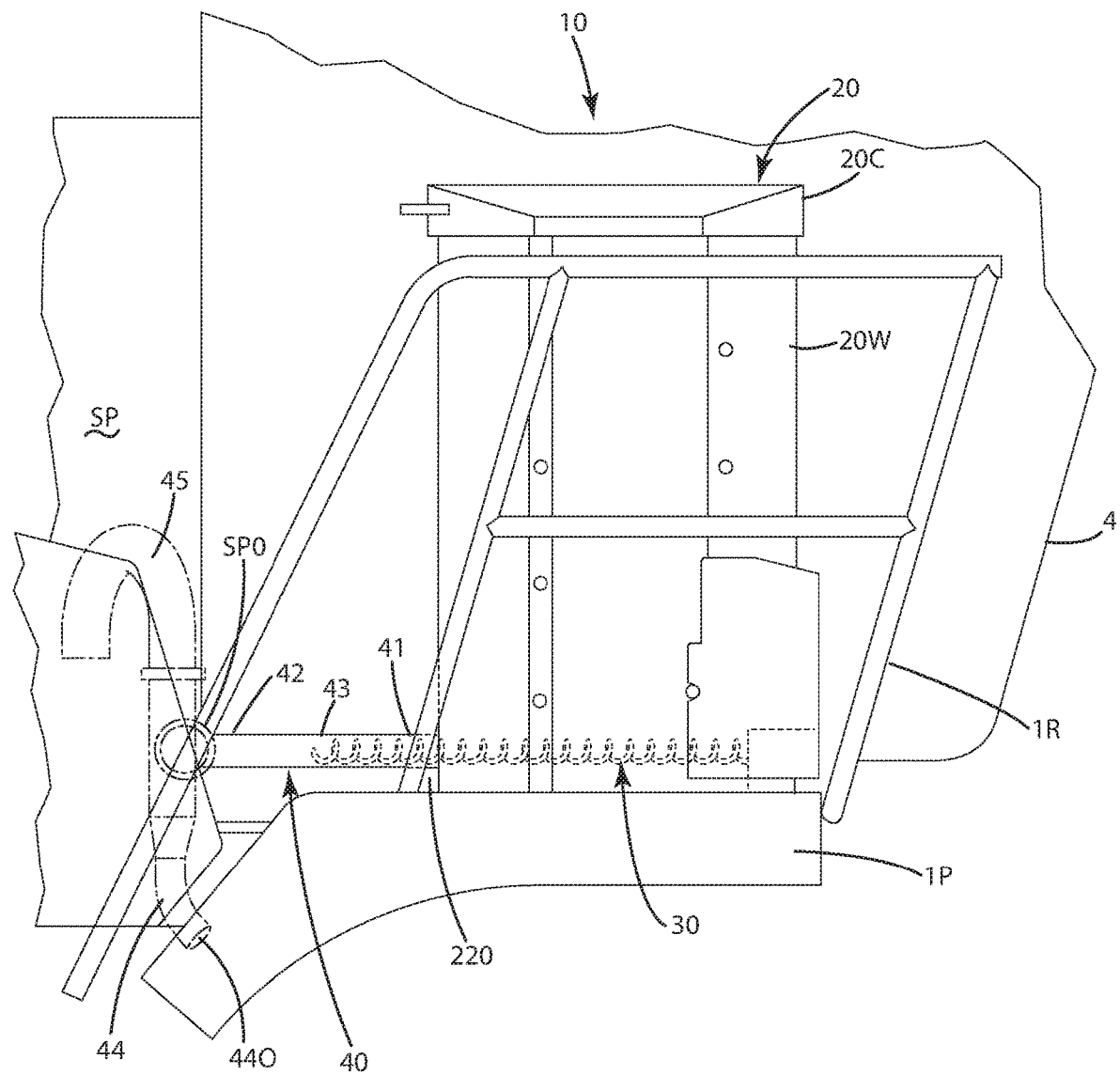
FIG. 5 is a front and section view of the bin and a motor that rotates the auger in the bottom of the bin.

Returning to the tube 40, it can extend from the opening 20O of the bin toward the chute 8 within which the forage material HF is conveyed, optionally under a vacuum as described above. The tube 40 can include a first or proximal end 41 that is adjacent and/or joined with the bin. The tube can include a second or distal end 42, with an intermediate portion 43 joining the proximal 41 and distal end 42. As shown, the tube 40 can extend through a side panel of the machine, at a location at or near the rear of the cab 4, and in some cases under the cab. The side panel SP can define a side panel opening SPO through which the tube 40 extends. The intermediate portion 42 can be disposed through this opening as shown in FIGS. 4 and 5. The distal end can be disposed behind and/or concealed by the side panel SP in the machine.

Optionally, the distal end 42 of the tube 40 can include a drop tube or pipe 44 and/or a vent 45. The drop pipe can extend downward or laterally or transversely from the distal end 42 and can include an ejection opening 44O, which can be disposes below or under a tube axis PA, and optionally below the platform 1P. The opening 44O can extend or point toward a pathway along which the harvested material travels, moves and/or is propelled. In some cases, the opening can open into or otherwise be disposed in the chute 8 of the machine, or along or in some other pathway along which the harvested forage HF travels. The material conveyed in the tube thus can be ejected out the opening 44O directly into the pathway, for example, into the chute or some other part of the machine, to mix with the harvested forage HF. In some applications, that forage can be drawn by the vacuum V.

The distal end 42 of the tube 40 can include a vent 45 that extends upward and includes another or second opening 45O, which is distal from the ejection opening. This second opening 45O can provide venting for the tube and contents such as the material as the material is conveyed to the opening 44O. The vent can allow air to enter the tube and/or drop tube so that air can be drawn into the tube and the material does not become clogged in the tube 40 and/or drop tube 44. The second opening 45O optionally can be disposed above the tube axis PA. That opening 45O also can be disposed above the ejection opening 44O as well, and generally outside and/or above the chute 8. The vent 45 can optionally be curved downward, with the opening 45O facing generally downward so that water and debris cannot enter the vent under gravity.

Further optionally, in some applications, a vacuum V in the chute also can be exerted on material in the drop tube 44 and/or in portion of the tube itself. Accordingly, the vacuum can draw some of the material into the chute to some extent. Because the auger in the tube conveys the material in the tube, augering it along the blade and/or the internal passageway, the auger and vacuum can cooperate to move material in the tube toward the chute to mix with the harvested material HF in the chute. Where the granular treatment material includes sand mixed with a preservative, that sand and the preservative can move through the curved transfer tube near the second or distal or terminating end under the vacuum until the sand and preservative collide with the harvested forage moving in the chute. The auger can move more of the material, or generally cause more of its movement than the vacuum, particularly where the flexible auger extends into the tube and nearer to the first or proximal end 41.

The tube 30 and bin 20 can be oriented on the machine 1 to facilitate efficient deployment and application of the granular treatment material to the chute and to the harvested forage therein. For example, as shown in FIG. 3, forage harvester can include a longitudinal axis LA. The bin 20 can be offset to the side of the longitudinal axis LA, and disposed on a platform 1P. The tube 40 can extend and curve toward the side panel SP and the longitudinal axis LA of the harvester rearward of the bin 20, and optionally rearward of the cab 4. The tube can curve inward toward the longitudinal axis LA rearward of the bin 20. In so doing, the tube can pass through the side panel SP of the machine. The terminating or distal end 42 can be closer to the longitudinal axis LA than the proximal end 41 or the bin 20. In operation, as the auger 30 rotates, the granular treatment material is conveyed into the tube with the linear portion 30L of the auger; and the material is conveyed with the curvilinear portion 30C of the auger toward the longitudinal axis LA rearward of the bin.

A method of using the applicator system 10 of the current embodiment to deliver a granular treatment material to forage during harvesting will now be described. The method can generally include: harvesting forage HF from a field with a forage harvester 1 as the harvester moves; rotating a flexible auger 30 in the bin 20; moving the granular treatment material 100 through a tube 40, with the flexible auger, toward a harvested forage moving in a chute 8 so that the granular treatment material mixes with the harvested forage. Optionally, the flexible auger can include a curvilinear portion extending along or aligned with a curvilinear axis, and that curvilinear portion can convey the material along an arcuate path in the tube. The tube can have a corresponding curved portion within with the curvilinear portion of the auger extends.

More particularly, with reference to FIG. 1, a motorized forage harvester 1 can propel itself under its own power along the ground G of a field having a stand of forage F. As the harvester moves, it harvests the forage F with the chopper head 5. Harvested forage HF is drawn into and through the chute 8. A vacuum V is provided via a vacuum source, which optionally can be a fan 6 rotated by an engine 3 that also propels the body 2 and the harvester in general along the ground G. The vacuum V in the chute, optionally generated by the fan or some other vacuum source, draws the harvested material HF through the machine until it is passed through an ejector chute 7. Harvested material HF is ejected from the ejector chute along a trajectory into a container T that is distal from the harvester 1. The container T can be in the form of a trailer towed by a truck T1 in the field.

The treatment material 100 can be sprinkled or sprayed into, or otherwise mixed in and with the harvested material and dispersed throughout it as the material and the forage continue to flow and tumble and intermix through the remainder of the machine. By the time the harvested forge material reaches the ejector chute 7 and is ejected out of the chute into another container T, the treatment material 100 is adequately mixed with and throughout the forage HF to provide desired effect of treatment of the harvested forage.

The system 10 can be in full operation during the harvest activity, as the harvester moves and harvests the forage F. The bin 20 contains a supply of treatment material 100 such as those described herein. The treatment material 100 is fed by gravity, traveling downward toward the bottom, optionally funneled by the slanted walls 20SW toward the auger

30. Power is provided by a power source on board the harvester 1 to the motor 38 of the system. The motor rotates the flexible, helical auger 30 in the bottom of the bin. The blade fin 34 can engage the material. The linear auger portion 30L can rotate, with the material entering the internal passageway 33 and being conveyed therein and along the blade to the opening 20O. The material also can engage the transition portion 30T and the curvilinear portion 30C of the auger, with the material being moved thereby. The linear portion and the curvilinear portion can rotate simultaneously with one another to convey a granular treatment material in the bin and in the tube. The material enters the tube through the opening 20O. The material can continue to move in the tube, being conveyed by the auger portion extending in the tube. The material can move in the tube, in the internal auger passageway 33. The material also can be pushed along by the helical blade 34, adjacent the interior surface 40I of the tube.

The auger 30 can be rotated so that the auger curvilinear portion rotates about and along the auger curvilinear axis, optionally inside the tube. The auger curvilinear axis can be coincident and/or aligned with a tube curvilinear axis of the tube during this rotation. The auger, and in particular the curvilinear portion, can be constrained in a curved configuration as the auger rotates, by the curved portion 40C of the tube. The granulated treatment material 100 also can be conveyed along an arcuate path in the curved transfer tube during the conveying step.

As the material is augered in the tube, it passes through the proximal end, and to the intermediate portion. Where the auger terminates before or in the intermediate portion, at an auger distal end, that can be the last location where the auger directly engages the material. The auger, however, can continue to push the material beyond the distal end, so that the material still continues to be conveyed to the distal end of the tube. The blade of the auger as it rotates continues this pushing or conveying action.

As the material continues through the tube, it also can travel along arcuate paths corresponding to the one or more radii R1 and/or R2 mentioned above. As shown in FIGS. 2 and 3, the material can be conveyed in the curvilinear portion of the tube, with the curvilinear portion of the auger along the curvilinear axis. The material also can travel toward the longitudinal axis LA rearward of the bin. The material can travel through the tube and through the side panel SP of the machine. Eventually, the material can be conveyed through the tube and can arrive at the distal end 42 of the tube. Where the tube includes a drop tube 44, the material in the tube can drop downward into a pathway along which the harvested forage is moved, for example, in the chute 8. The material can be expelled under force into the pathway of the harvested forage. In some cases, the material can be expelled from the opening, generally vertically through the drop tube under the force of gravity, and/or a pushing force produced by the auger on the material in the tube, into the harvested forage. In some applications, where the chute has a vacuum drawn through it, the vacuum force can pull some of the material out of the drop tube. The vacuum and the mechanical augering via the auger 30 thus can cooperate to deliver the material 100 to the harvested forage HF travelling in the chute. As the harvested forage HF continues through the machine and out the ejector chute 7, the material and harvested forge can thoroughly mix with one another so that the treatment material is dispersed within the harvested forage HF by the time it is shot along a trajectory and/or dumped into the container T.

Figure 6:
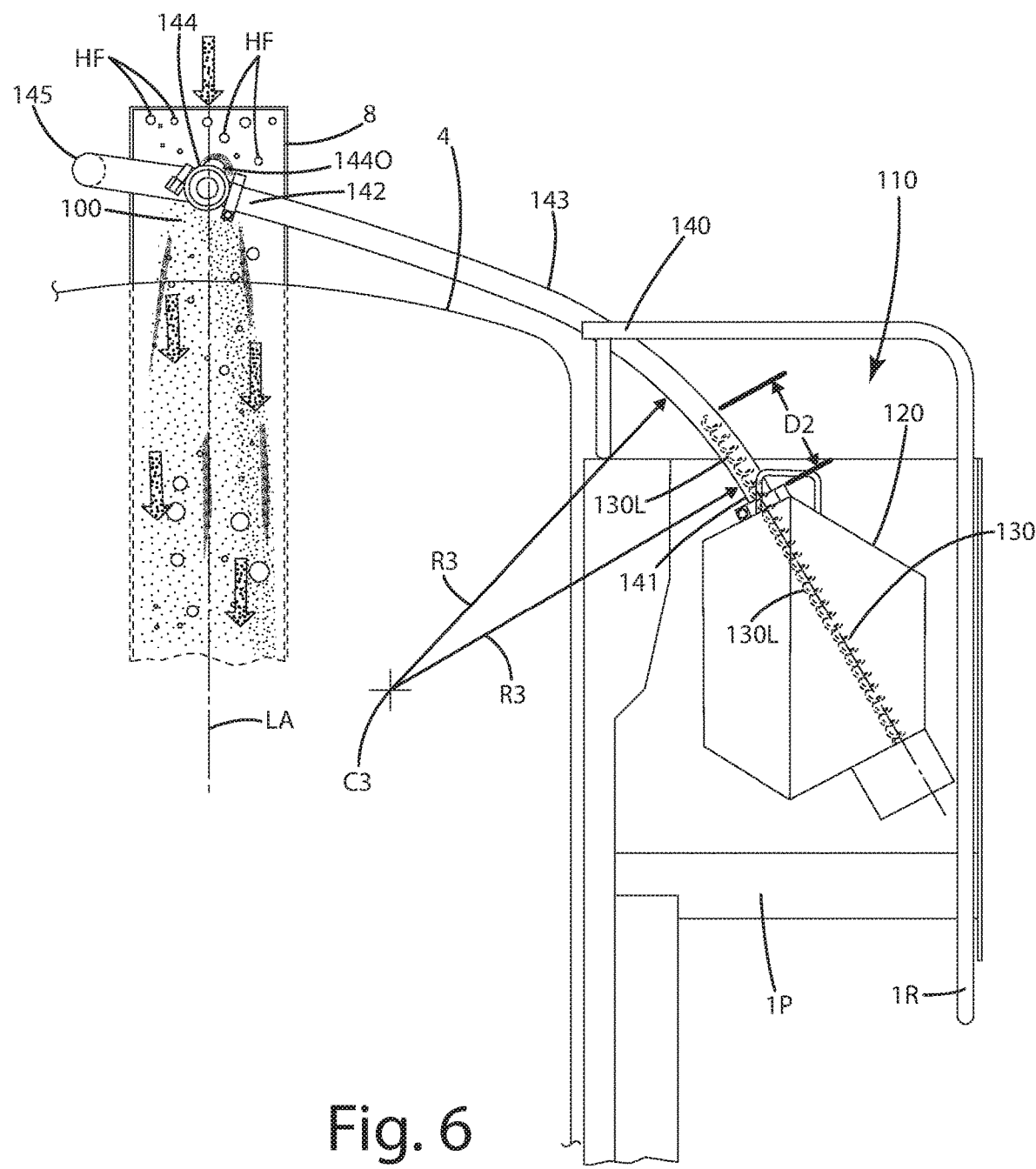
FIG. 6 is a top view of a system of an alternative embodiment with the tube extending forward of the bin and forward of a cab of the forage harvester.

A first alternative embodiment of the system is shown in FIG. 6 and generally designated 110. That system is virtually identical to the system 10 above in structure, function and operation with several exceptions. For example, the system 110 includes a bin 120 mounted on a platform 1P of a harvester 1 having a cab 4. A flexible, helical auger 130, which can be of the type mentioned above with a blade and a hollow core or internal passageway, can be mounted in the bottom of the bin 120 and can extend into a curved or angled tube 140 a distance D2, which can be equal to the distance D1 mentioned above. The auger can include a linear auger portion 130L and a curvilinear auger portion 130C, which can be rotationally disposed in the tube 140. The tube and the curvilinear portion can extend along an arcuate path about a center C3 and at a radius R3 from the center. The radius R3 can be similar to the radius R1 mentioned above.

In this embodiment, the tube, however, can extend forward from the bin, and optionally forward or in front of the cab 4 of the harvester 1. The tube can curve, angle or otherwise extend toward the longitudinal axis LA of the harvester forward of the cab and/or forward of the bin 120. The tube can extend to the distal end 142. That distal end can include a drop tube 144 and a vent 145 similar to the ones noted above. The drop tube 144 can extend into, can be adjacent, and/or can be in alignment with the chute, feed rollers of the machine, a portion of the head of the machine, or generally near, above and/or adjacent a pathway along which the harvested forage moves into and/or through the machine. The drop tube can include an opening 144O that can expel or apply the material conveyed in the tube into the chute or some other pathway to effectively mix with the harvested forage therein. In some cases, the drop tube simply allows the material to drop out of the tube via gravity into a pathway along which the harvested material moves. The material thus mixes with the harvested material.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to" or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law, including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

The invention claimed is:

1. A method of using an agricultural forage treatment applicator system to deliver a granular treatment material to forage during harvesting, the method comprising:

harvesting forage from a field with a motorized forage harvester as the motorized forage harvester moves in the field under power provided by a motor of the motorized forage harvester;

conveying harvested forage through a chute and along a pathway, the motorized forage harvester having an operator cab, within which an operator is located, disposed above the chute;

providing a bin mounted on the motorized forage harvester;

providing a tube extending laterally away from the bin toward the pathway and including a distal tube end in communication with the pathway;

rotating a helical, flexible auger in a bottom of the bin, the auger having a linear portion disposed in the bottom of the bin and a curvilinear portion extending at least six inches into the tube, the linear portion and the curvilinear portion rotating simultaneously with one another to convey a granular treatment material in the bin and in the tube; and moving the granular treatment material through the tube at least partially with the rotating auger so that the granular treatment material mixes with the harvested forage moving along the pathway, wherein the tube curves in a horizontal plane and extends forwardly around a front of the operator cab of the motorized forage harvester, wherein the granulated treatment material is conveyed along an arcuate path in the tube during the conveying step forward of the operator cab.

2. The method of claim 1, wherein the granular treatment material includes sand mixed with a preservative, wherein the sand and the preservative move out of the tube near a terminating end of the tube under a vacuum so the sand and preservative collide with the harvested forage moving along the pathway.

3. The method of claim 1, wherein the granular treatment material includes sand mixed with a preservative, wherein the sand and the preservative move out of the tube near a terminating end of the tube under a vacuum, with the sand and preservative colliding with the harvested forage moving in the chute.

4. The method of claim 1 comprising;

providing a longitudinal axis of the motorized forage harvester;

conveying the granular treatment material with the linear portion of the auger; and conveying the granular treatment material with the curvilinear portion of the auger toward the longitudinal axis forward of the bin, and forward of the operator cab.

5. The method of claim 1, wherein the tube includes a distal end, wherein the distal end includes a drop tube having an ejection opening and a vent distal from the drop tube and including a vent opening configured to allow air to enter the tube.

6. The method of claim 5, wherein the vent opening is disposed above the ejection opening.

7. A method of using an agricultural forage treatment applicator system to deliver a granular treatment material to forage during harvesting, the method comprising:

harvesting forage from a field with a motorized forage harvester as the motorized forage harvester moves in the field under power provided by a motor of the motorized forage harvester;

conveying harvested forage through a chute and along a pathway, the motorized forage harvester having an operator cab, within which an operator is located, disposed above the chute;

providing a bin mounted on the motorized forage harvester;

providing a tube extending laterally away from the bin toward the pathway and including a distal tube end in communication with the pathway;

rotating a helical, flexible auger in a bottom of the bin, the auger having a linear portion disposed in the bottom of the bin and a curvilinear portion extending at least six inches into the tube, the linear portion and the curvilinear portion rotating simultaneously with one another to convey a granular treatment material in the bin and in the tube; and moving the granular treatment material through the tube at least partially with the rotating auger so that the granular treatment material mixes with the harvested forage moving along the pathway, wherein the auger includes a helical blade that wraps around an internal auger passageway, wherein a portion of the granulated treatment material is conveyed along the internal auger passageway during the rotating, wherein the internal auger passageway is substantially cylindrical in the linear portion of the auger, wherein the internal auger passageway extends along a curvilinear axis having a radius of curvature in the curvilinear portion of the auger, wherein the curvilinear axis lays in a horizontal plane.

8. The method of claim 7,
wherein the tube extends forwardly around the operator cab of the motorized forage harvester,
wherein the granulated treatment material is conveyed along an arcuate path in the tube during the conveying step.

9. A method of using an agricultural forage treatment applicator system to deliver a granular treatment material to forage during harvesting, the method comprising:
harvesting forage from a field with a motorized forage harvester as the motorized forage harvester moves in the field under power provided by a motor of the motorized forage harvester;
conveying harvested forage through a chute and along a pathway, the motorized forage harvester having an operator cab, within which an operator is located, disposed above the chute;
providing a bin mounted on the motorized forage harvester;
providing a tube extending laterally away from the bin toward the pathway and including a distal tube end in communication with the pathway;
rotating a helical, flexible auger in a bottom of the bin, the auger having a linear portion disposed in the bottom of the bin and a curvilinear portion extending at least six inches into the tube, the linear portion and the curvilinear portion rotating simultaneously with one another to convey a granular treatment material in the bin and in the tube;
moving the granular treatment material through the tube at least partially with the rotating auger so that the granular treatment material mixes with the harvested forage moving along the pathway;
providing a longitudinal axis of the forage harvester;
conveying the granular treatment material with the linear portion of the auger;
conveying the granular treatment material with the curvilinear portion of the auger toward the longitudinal axis rearward of the bin; and
conveying the granular treatment material in the tube through a side panel of the motorized forage harvester and toward the longitudinal axis,
wherein the granular treatment material travels through the tube from the bin and toward the chute.

10. A method of using an agricultural forage treatment applicator system to deliver a granular treatment material to forage during harvesting, the method comprising:
harvesting forage from a field with a forage harvester as the harvester moves;
rotating an auger in a bin, the auger having a length and a curvilinear portion along the length, the curvilinear portion having a curvilinear axis along the length, the curvilinear axis laying in a horizontal plane; and
moving the granular treatment material through a tube, with the curvilinear portion of the auger, toward a harvested forage moving along a pathway so that the granular treatment material mixes with the harvested forage as the harvested forage moves along the pathway.

11. The method of claim 10,
wherein during the rotating, an auger linear portion rotates about an auger linear axis in a bottom of the bin,
wherein the curvilinear portion rotates about the curvilinear axis outside the bin in the horizontal plane and in the tube.

12. The method of claim 10,
wherein the tube includes a distal end,
wherein the distal end includes a drop tube having an ejection opening through which the granular treatment travels toward the pathway, and a vent distal from the drop tube and including a vent opening configured to allow air to enter the tube.

13. The system of claim 10,
wherein the auger extends into a curved tube portion of the tube at least six inches,
wherein the auger extends forward of the bin,
wherein the tube extends forward of a cab of the forage harvester toward the pathway along which a harvested forage travels.

14. The system of claim 10,
wherein the auger extends into a curved tube portion of the tube at least six inches,
wherein the auger extends rearward of the bin,
wherein the tube extends through a side panel of the forage harvester toward the pathway along which the forage material travels.

15. An agricultural forage treatment applicator system for delivering a granular treatment material to forage during harvesting, the system comprising:
a gravity fed bin having at least one sidewall extending toward a bottom, the bin configured to store a supply of granular treatment material, the bin configured to be mounted on a motorized forage harvester;
a tube extending from the gravity fed bin;
a helical, flexible auger disposed in the bottom of the bin, the auger having a blade that extends around an auger central passageway, the auger configured to rotate and auger the granular treatment material with the blade out an opening of the bin; and
a motor joined with the auger and configured to rotate the auger at one or more RPMs
wherein the granular treatment material travels through the tube and toward a pathway along which a harvested forage moves so that the granular treatment material mixes with the harvested forage,
wherein the tube includes a distal end,
wherein the distal end includes a drop tube having an ejection opening through which the granular treatment travels toward the pathway, and a vent distal from the drop tube and including a vent opening configured to allow air to enter the tube.

16. The system of claim 15,
wherein the tube includes a curved tube portion,
wherein the auger extends into the curved tube portion and takes on a curved configuration extending into the curved tube portion so that the auger extends along a curvilinear axis and includes a curvilinear portion that is rotationally constrained in the curved tube portion.

17. The system of claim 16,
wherein the auger extends into the curved tube portion at least six inches,
wherein the auger extends forward of the bin,
wherein the tube extends forward of a cab of the forage harvester toward the pathway along which a harvested forage travels.

18. The system of claim 15,
wherein the auger extends along a linear axis in the bin and transitions to a curvilinear axis along which the auger extends outside the bin.

19. The method of claim 15,
wherein the vent opening is disposed above the ejection opening.

20. A method of using an agricultural forage treatment applicator system to deliver a granular treatment material to forage during harvesting, the method comprising:
- harvesting forage from a field with a forage harvester as the harvester moves;
- rotating an auger in a bin, the auger having a length and a curvilinear portion along the length, the curvilinear portion having a curvilinear axis along the length; and
- moving the granular treatment material through a tube, with the curvilinear portion of the auger, toward a harvested forage moving along a pathway so that the granular treatment material mixes with the harvested forage as the harvested forage moves along the pathway,
- wherein the tube includes a curved tube portion,
- wherein the auger extends into the curved tube portion at least six inches,
- wherein the auger extends rearward of the bin,
- wherein the tube extends through a side panel of the forage harvester toward the pathway along which the forage material travels.

* * * * *